(12) United States Patent
Cronin et al.

(10) Patent No.: US 9,965,938 B1
(45) Date of Patent: May 8, 2018

(54) RESTROOM QUEUE MANAGEMENT

(71) Applicant: ProSports Technologies, LLC, Miami, FL (US)

(72) Inventors: John E. Cronin, Bonita Springs, FL (US); Nick Reasner, Miami, FL (US)

(73) Assignee: PROSPORTS TECHNOLOGIES, LLC, Miami, FL (US)

( * ) Notice: Subject to any disclaimer, the term of this patent is extended or adjusted under 35 U.S.C. 154(b) by 0 days. days.

(21) Appl. No.: 14/798,210

(22) Filed: Jul. 13, 2015

Related U.S. Application Data

(60) Provisional application No. 62/023,501, filed on Jul. 11, 2014.

(51) Int. Cl.
*G08B 1/08* (2006.01)
*G08B 21/18* (2006.01)
*H04W 4/02* (2018.01)

(52) U.S. Cl.
CPC .............. *G08B 21/18* (2013.01); *H04W 4/02* (2013.01)

(58) Field of Classification Search
CPC ........ G06Q 10/06; G06Q 10/02; G06Q 10/00; G06Q 10/025; G06Q 10/10; G06Q 10/047; G06Q 10/063114; G07C 2011/04; G08B 5/221; H04L 67/12; H04W 4/00
USPC .............................. 340/539.1, 539.11, 539.13
See application file for complete search history.

(56) References Cited

U.S. PATENT DOCUMENTS

| | | | |
|---|---|---|---|
| 6,329,919 B1 * | 12/2001 | Boies et al. ................ | 340/573.1 |
| 6,778,085 B2 | 8/2004 | Faulkner et al. | |
| 7,671,730 B2 | 3/2010 | Henderson | |
| 7,715,723 B2 | 5/2010 | Kagawa et al. | |
| 7,724,131 B2 | 5/2010 | Chen | |
| 7,778,855 B2 | 8/2010 | Holliday | |
| 7,929,867 B2 | 4/2011 | Nakagawa | |
| 7,970,537 B2 | 6/2011 | Ann et al. | |
| 8,126,782 B1 | 2/2012 | Zhu et al. | |
| 8,188,878 B2 | 5/2012 | Pederson et al. | |
| 8,275,096 B2 | 9/2012 | Neece | |
| 8,589,667 B2 | 11/2013 | Mujtaba et al. | |
| 8,611,930 B2 | 12/2013 | Louboutin et al. | |

(Continued)

FOREIGN PATENT DOCUMENTS

| | | |
|---|---|---|
| CN | 102843186 | 12/2012 |
| KR | 10-20080050251 | 6/2008 |

(Continued)

OTHER PUBLICATIONS

U.S. Appl. No. 14/731,810, John Cronin, Concession Management, filed Jun. 5, 2015.

(Continued)

*Primary Examiner* — Emily C Terrell
(74) *Attorney, Agent, or Firm* — Polsinelli LLP

(57) ABSTRACT

The present invention includes systems and methods for managing restroom traffic at an event venue. Sensors at restroom facilities receive line and occupancy data and transmit the data to a system for processing. The system generates information regarding a travel time, a wait time, line length, and occupancy for each facility at the event venue. The generated information is transmitted to an event app associated with a ticket and a seat for an event at the venue. The system can notify the user when the combined travel time and wait time for a facility falls below a predetermined threshold.

18 Claims, 8 Drawing Sheets

(56) References Cited

U.S. PATENT DOCUMENTS

| | | | |
|---|---|---|---|
| 8,620,344 B2 | 12/2013 | Huang et al. | |
| 8,626,465 B2 | 1/2014 | Moore et al. | |
| 8,630,216 B2 | 1/2014 | Deivasigamani et al. | |
| 8,660,501 B2 | 2/2014 | Sanguinetti | |
| 8,706,044 B2 | 4/2014 | Chang et al. | |
| 8,724,723 B2 | 5/2014 | Panicker et al. | |
| 8,750,207 B2 | 6/2014 | Jeong et al. | |
| 8,789,175 B2 | 7/2014 | Hubner et al. | |
| 8,793,094 B2 | 7/2014 | Tam et al. | |
| 8,816,868 B2 | 8/2014 | Tan et al. | |
| 8,831,529 B2 | 9/2014 | Toh et al. | |
| 8,831,655 B2 | 9/2014 | Burchill et al. | |
| 8,836,851 B2 | 9/2014 | Brunner | |
| 8,843,158 B2 | 9/2014 | Nagaraj | |
| 8,849,308 B2 | 9/2014 | Marti et al. | |
| 8,862,060 B2 | 10/2014 | Mayor | |
| 8,863,172 B2 | 10/2014 | Hardin et al. | |
| 8,873,418 B2 | 10/2014 | Robinson et al. | |
| 8,874,090 B2 | 10/2014 | Abuan et al. | |
| 8,917,632 B2 | 12/2014 | Zhou et al. | |
| 8,934,921 B2 | 1/2015 | Marti et al. | |
| 9,054,800 B2 | 6/2015 | Suresh et al. | |
| 9,449,121 B2 | 9/2016 | Marti | |
| 9,607,497 B1 | 3/2017 | Cronin | |
| 9,892,371 B1 | 2/2018 | Cronin | |
| 2002/0167408 A1* | 11/2002 | Trajkovic | G06Q 30/06 340/573.1 |
| 2003/0014749 A1 | 1/2003 | Simons et al. | |
| 2003/0036936 A1 | 2/2003 | Steichen et al. | |
| 2003/0102956 A1* | 6/2003 | McManus | G07C 11/00 340/5.2 |
| 2004/0260513 A1* | 12/2004 | Fitzpatrick | G06Q 10/06 702/182 |
| 2006/0273920 A1* | 12/2006 | Doan et al. | 340/825.29 |
| 2009/0112638 A1* | 4/2009 | Kneller et al. | 705/5 |
| 2009/0249342 A1* | 10/2009 | Johnson | G06Q 10/04 718/101 |
| 2009/0319306 A1* | 12/2009 | Chanick | G01C 21/3679 705/5 |
| 2010/0141480 A1* | 6/2010 | Brooks | G06Q 10/047 340/944 |
| 2011/0029894 A1 | 2/2011 | Eckstein | |
| 2011/0179041 A1 | 7/2011 | Souto et al. | |
| 2012/0078667 A1* | 3/2012 | Denker | G06Q 10/02 705/5 |
| 2012/0116863 A1* | 5/2012 | Boss | G06Q 30/0235 705/14.35 |
| 2012/0130761 A1 | 5/2012 | Mohan | |
| 2012/0154169 A1 | 6/2012 | Hoekstra | |
| 2012/0207350 A1 | 8/2012 | Loos | |
| 2012/0315868 A1 | 12/2012 | Ben-Alexander | |
| 2013/0126713 A1 | 5/2013 | Haas et al. | |
| 2013/0141555 A1 | 6/2013 | Ganick et al. | |
| 2013/0183924 A1 | 7/2013 | Saigh et al. | |
| 2013/0211715 A1 | 8/2013 | Bae et al. | |
| 2013/0279917 A1 | 10/2013 | Son et al. | |
| 2013/0303192 A1 | 11/2013 | Louboutin | |
| 2013/0317835 A1 | 11/2013 | Mathew | |
| 2013/0317944 A1* | 11/2013 | Huang | G01S 5/0252 705/26.61 |
| 2013/0328917 A1 | 12/2013 | Zhou | |
| 2013/0331087 A1 | 12/2013 | Shoemaker | |
| 2013/0331118 A1 | 12/2013 | Chhabra | |
| 2013/0331137 A1 | 12/2013 | Burchill | |
| 2013/0332108 A1 | 12/2013 | Patel | |
| 2013/0332156 A1 | 12/2013 | Tackin | |
| 2013/0332208 A1* | 12/2013 | Mehta | G06Q 10/02 705/5 |
| 2013/0336662 A1 | 12/2013 | Murayama et al. | |
| 2013/0343762 A1 | 12/2013 | Murayama et al. | |
| 2014/0046802 A1* | 2/2014 | Hosein | G01R 1/06711 705/26.61 |
| 2014/0055619 A1 | 2/2014 | Holland et al. | |
| 2014/0062773 A1 | 3/2014 | MacGougan | |
| 2014/0065962 A1 | 3/2014 | Le | |
| 2014/0071221 A1 | 3/2014 | Dave | |
| 2014/0072119 A1 | 3/2014 | Hranilovic et al. | |
| 2014/0105084 A1 | 4/2014 | Chhabra | |
| 2014/0132400 A1 | 5/2014 | Heaven et al. | |
| 2014/0139380 A1 | 5/2014 | Ouyang | |
| 2014/0141803 A1 | 5/2014 | Marti | |
| 2014/0162628 A1 | 6/2014 | Bevelacqua | |
| 2014/0167794 A1 | 6/2014 | Nath | |
| 2014/0168170 A1 | 6/2014 | Lazarescu | |
| 2014/0171114 A1 | 6/2014 | Marti | |
| 2014/0180820 A1 | 6/2014 | Louboutin | |
| 2014/0191979 A1 | 7/2014 | Tsudik | |
| 2014/0200053 A1 | 7/2014 | Balasubramanian | |
| 2014/0222335 A1 | 8/2014 | Piemonte | |
| 2014/0232633 A1 | 8/2014 | Shultz | |
| 2014/0232634 A1 | 8/2014 | Piemonte | |
| 2014/0241730 A1 | 8/2014 | Jovicic et al. | |
| 2014/0247279 A1 | 9/2014 | Nicholas | |
| 2014/0247280 A1 | 9/2014 | Nicholas | |
| 2014/0269562 A1 | 9/2014 | Burchill | |
| 2014/0274150 A1 | 9/2014 | Marti | |
| 2014/0283135 A1 | 9/2014 | Shepherd | |
| 2014/0293959 A1 | 10/2014 | Singh | |
| 2014/0363168 A1 | 12/2014 | Walker | |
| 2014/0364089 A1 | 12/2014 | Lienhart | |
| 2014/0364148 A1 | 12/2014 | Block | |
| 2014/0365120 A1 | 12/2014 | Vulcano | |
| 2014/0375217 A1 | 12/2014 | Feri et al. | |
| 2015/0011242 A1 | 1/2015 | Nagaraj | |
| 2015/0026623 A1 | 1/2015 | Horne | |
| 2015/0031397 A1 | 1/2015 | Jouaux | |
| 2015/0038171 A1 | 2/2015 | Uilecan et al. | |
| 2015/0049190 A1 | 2/2015 | Galvez et al. | |
| 2015/0137986 A1 | 5/2015 | Kang et al. | |
| 2016/0005053 A1* | 1/2016 | Klima | G06Q 30/0201 705/7.29 |

FOREIGN PATENT DOCUMENTS

| | | |
|---|---|---|
| KR | 10-1133539000 | 4/2012 |
| WO | WO 2009/104921 | 8/2009 |

OTHER PUBLICATIONS

U.S. Appl. No. 14/798,291, John Cronin, Queue Information Transmission, filed Jul. 13, 2015.

U.S. Appl. No. 14/732,394, John Cronin, Wireless Concession Delivery, filed Jun. 5, 2015.

U.S. Appl. No. 14/818,226, John Cronin, Wireless Communication Security System, filed Aug. 4, 2015.

Bandela et al.; Praveen; "Li-Fi (Light Fidelity): The Next Generation of Wireless Network", International Journal of Advanced Trends in Computer Science and Engineering, vol. 3, No. 1, pp. 132-137 (2014).

Blau, John; "Security wins at German soccer stadium", Network World, Mar. 7, 2006.

Burchardt, Harald; "A Proposed Architecture for Short "Rolling Shutter" Messages", IEEE P802.15, Wireless Personal Area Networks, Mar. 2014.

"Challenge iBeacon Philips Smart LED communication system to locate commercial indoor lighting", by Sunricher, Feb. 18, 2014.

"Create Innovative Services with Play APPs", Date of Download: Jan. 16, 2014, http://www.oledcomm.com/LIFI.html, Oledcomm—France LiFi.

"Customer Retail Analytics", Nanuka Digital Solutions, Jun. 2, 2014.

Danakis, C et al.; "Using a CMOS Camera Sensor for Visible Light Communication"; 3rd IEEE Workshop on Optical Wireless Communications; [online], Dec. 3-7, 2012 [retrieved Aug. 14, 2015]. Retrieved from the Internet: <URL: https://195.134.65.236/ IEEE_Globecom_2012/papers/p1244-danakis.pdf> pp. 1244-1248.

Dawson, Keith; "LiFi in the Real World" All LED Lighting— Illuminating the Led Community, Jul. 31, 2013.

(56) References Cited

OTHER PUBLICATIONS

Eng, James; "Beer lines at 49ers stadium: There's an app for that", MSN News, Jul. 31, 2013.
"Get the Conversion Advantage With LightHause Visual Customer Intelligence", Visual Customer Intelligence, Sep. 16, 2012.
Gorman, Michael; "Outstanding Technology brings visible light communication to phones and tablets via dongle and LEDs", Edgadget International Editions, Jul. 16, 2012.
Haas, Harald; "Delivering safe and secure wireless communications", pureLiFi. Date of download: Jan. 16, 2014 http://purelifi.co.uk/.
Kumar, Navin; "Visible Light Communications Systems Conception and VIDAS", IETE Technical Review, vol. 25, Issue 6, Nov.-Dec. 2008. Date of download: Nov. 19, 2009. http://www.tr.ietejournals.org.
Li, Yang et al., "VICO: A Framework for Configuring Indoor Visible Light Communication Networks" Aug. 11, 2012, Mobile Adhoc and Sensor Systems (MASS), 2012 IEEE 9th International Conference, Las Vegas, NV.
LiFi Overview—Green wireless mobile communication—LiFi Technology. Date of download: Jan. 16, 2014.
LIGHTimes Online—LED Industry News,Jun. 17, 2014.
Montero, Eric, "Design and Implementation of Color-Shift Keying for Visible Light Communications", Sep. 2013, McMaster University.
"Nextiva Retail Traffic Analytics—Understanding Shopper Behavior to Improve Sales and the Customer Experience", Verint. Video Intelligence Solution. Aug. 2010.
Nguyen et al., "A Novel like switching scheme using pre-scanning and RSS prediction in visible light communication networks", EURASIP Journal on Wireless Communications and Networking, 2013.
Ogawa; "Article about VLC Guidance developed", Visible Light Communications Consotium (VLCC), Aug. 31, 2012.
Ogawa; "iPhone app from CASIO", Visible Light Communications Consotium (VLCC), Apr. 26, 2012.
Povey, Gordon, "VLC for Location, positioning and navigation", Jul. 27, 2011, http://visiblelightcomm.com/vlc-for-location-positioning-and-n . . . .
"Smart lights help shoppers find groceries", Lux Magazine, Feb. 19, 2014.
Thanigavel, M.; "Li-Fi Technology in Wireless Communication", International Journal of Engineering Research & Technology (IJERT), ISSN: 2278-0181, vol. 2 Issue 10, Oct. 2013.
TrueView Queue—Manual, Embedded for Axis IP cameras, version 1.0, Mar. 7, 2014.
Valinsky, Jordan; "Madison Square Garden May Add a Bathroom Wait Time App So at Least You Can Enjoy Some Sort of Victory", Betabeat, Oct. 22, 2013.
Video Analytics: Understanding Rules and Exception-based Reporting—A 3xLOGIC Discussion Guide, Intelligent Video Surveillance. Oct. 19, 2011.
Won, Eun Tae; "Visible Light Communication: Tutorial", Project: IEEE P802.15 Working Group for Wireless Personal Area Networks (WPANs), Mar. 9, 2008.
PCT Application No. PCT/US2015/033613 International Search Report and Written Opinion dated Sep. 1, 2015.
U.S. Appl. No. 14/798,210 Office Action dated Oct. 16, 2015.
U.S. Appl. No. 14/798,291 Office Action dated Nov. 17, 2015.
U.S. Appl. No. 14/818,226 Office Action dated Sep. 28, 2015.
U.S. Appl. No. 14/798,291 Final Office Action dated Jun. 17, 2016.
U.S. Appl. No. 14/818,226 Final Office Action dated Apr. 1, 2016.
U.S. Appl. No. 14/732,394 Final Office Action dated Feb. 9, 2018.
Chu, Liou; Hui, Lin; and Hung, Fu-Yi, "Simulation of Theme Park Queuing System by Using Arena", Oct. 16-18, 2013; Proceeding IIH-MSP '13 Proceedings of the 2013 Ninth International Conference on Intelligent Information Hiding and Multimedia Signal Processing, pp. 17-20.
U.S. Appl. No. 14/732,394 Office Action dated Sep. 20, 2017.

* cited by examiner

Map 205

X = You 210

Ticket ID Code  IK-555A

Enabled ✓ 220

| Type | Restroom | Occupancy | Line | Wait | Walk |
|---|---|---|---|---|---|
| M | R1 | Full | Long | 10 min. | 10 min. |
| W | R2 | Full | Short | 5 min. | 7 min. |
| M | R3 | 50% | Medium | 5 min. | 3 min. |
| W | Rn | 25% | None | No wait. | 2 min. |

M = Men; W = Women

Alarm when wait + walk  < 10 min.

FIG. 2

| Seat 310 | Purchase Restroom App 315 |
|---|---|
| 1A | No |
| 2A | No |
| 3A | Yes |
| 4A | Yes |
| ... | |

FIG. 3

| Restroom 405 | Time 410 | Line Data 415 | Occupancy 420 | Wait Min 425 |
|---|---|---|---|---|
| R1 | 1:00 | Long | Full | 10 |
| R1 | 1:02 | Long | Full | 10 |
| R1 | 1:03 | Medium | 25% | 5 |
| R2 | 1:00 | Short | Full | 5 |
| R2 | 1:01 | None | 50% | None |
| R2 | 1:02 | None | 25% | 2 |
| ... | | | | |

RESTROOM QUEUE MANAGEMENT

CROSS-REFERENCE TO RELATED APPLICATIONS

This application claims the priority benefit of U.S. provisional application No. 62/023,501, filed on Jul. 11, 2014 and titled "Restroom Management System Controlled By Stadium Owners," the disclosure of which is incorporated herein by reference.

BACKGROUND OF THE INVENTION

Field of the Invention

The present invention relates generally to facility management. More specifically, the present invention relates to selective information delivery based on user location.

Description of the Related Art

Venue management currently has a variety of options for directing traffic to restroom facilities. Management can post signs directing attendees to the closet facility. Management can also provide restroom information on a website or on a map at the venue.

It is difficult, however, to manage restroom traffic when most attendees use restrooms at the same time. Attendees may prefer to use restrooms during breaks in the game because there is ample time to stand in a long line for the restroom. It is also difficult to manage restroom traffic when most attendees prefer to use the closest restroom. Attendees may decide to use the closest restroom on the assumption that other restrooms have the same wait time and will require additional travel time.

There is a need in the art for improved systems and methods for managing restroom traffic.

SUMMARY OF THE PRESENTLY CLAIMED INVENTION

One exemplary method for managing restroom traffic describes receiving facility line data at one or more line sensors. The one or more line sensors are located at a venue. The method also describes receiving facility occupancy data at one or more occupancy sensors. The one or more occupancy sensors are located at the venue. The method also describes processing the line data to provide line information for input into a database. The line information is associated with the venue. The method also describes processing the occupancy data to provide occupancy information for input into the database. The occupancy information is associated with the venue. The method also describes transmitting the line information and occupancy information to a user device having an event app associated with the venue.

One exemplary system for managing restroom traffic provides one or more line sensors, one or more occupancy sensors, and a processor. The one or more line sensors receive facility line data. The line sensors are located at a venue. The one or more occupancy sensors receive facility occupancy data. The occupancy sensors are located at the venue. Execution of instructions stored in the memory by the processor performs a set of operations. The operations include processing the line data to provide line information for input into a database. The line information is associated with the venue. The operations also include processing the occupancy data to provide occupancy information for input into the database. The occupancy information is associated with the venue. The operations also include transmitting the line information and occupancy information to a user device having an event app associated with the venue.

One exemplary non-transitory computer-readable storage medium is also described, the non-transitory computer-readable storage medium having embodied thereon a program executable by a processor to perform an exemplary method for managing restroom traffic. The exemplary program method describes receiving facility line data at a venue. The program method also describes receiving facility occupancy data at the venue. The program method also describes processing the line data to provide line information for input into a database. The line information is associated with the venue. The program method also describes processing the occupancy data to provide occupancy information for input into the database. The occupancy information is associated with the venue. The program method also describes transmitting the line information and occupancy information to an event app associated with the venue.

BRIEF DESCRIPTION OF THE DRAWINGS

FIG. 2 illustrates an event restroom app graphical user interface.
FIG. 3 illustrates a ticket database table.
FIG. 4 illustrates a restroom database table.

DETAILED DESCRIPTION

The present invention includes systems and methods for managing restroom traffic at an event venue. Sensors at restroom facilities receive line and occupancy data and transmit the data to a system for processing. The system generates information regarding a wait time, line length, and occupancy for each facility at the event venue. The generated information is transmitted to an event application ("app") associated with a ticket and a seat for an event at the venue. The event app provides the generated information to a user through a user device display. The system also generates information regarding travel time to each facility from the associated seat and transmits the information to the user device for display. The system can notify the user when the combined travel time and wait time for a facility falls below a threshold set in the app by the user.

Restroom traffic can be managed for entertainment or cultural events that are presented at a theatre, gymnasium, stadium, or other facility to a group of people. Such events include a wide variety of sporting events such as football (American and Global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, the opera, and the like; religious events; and more permanent exhibitions such as museum, historic home, and the like.

Figure 1:
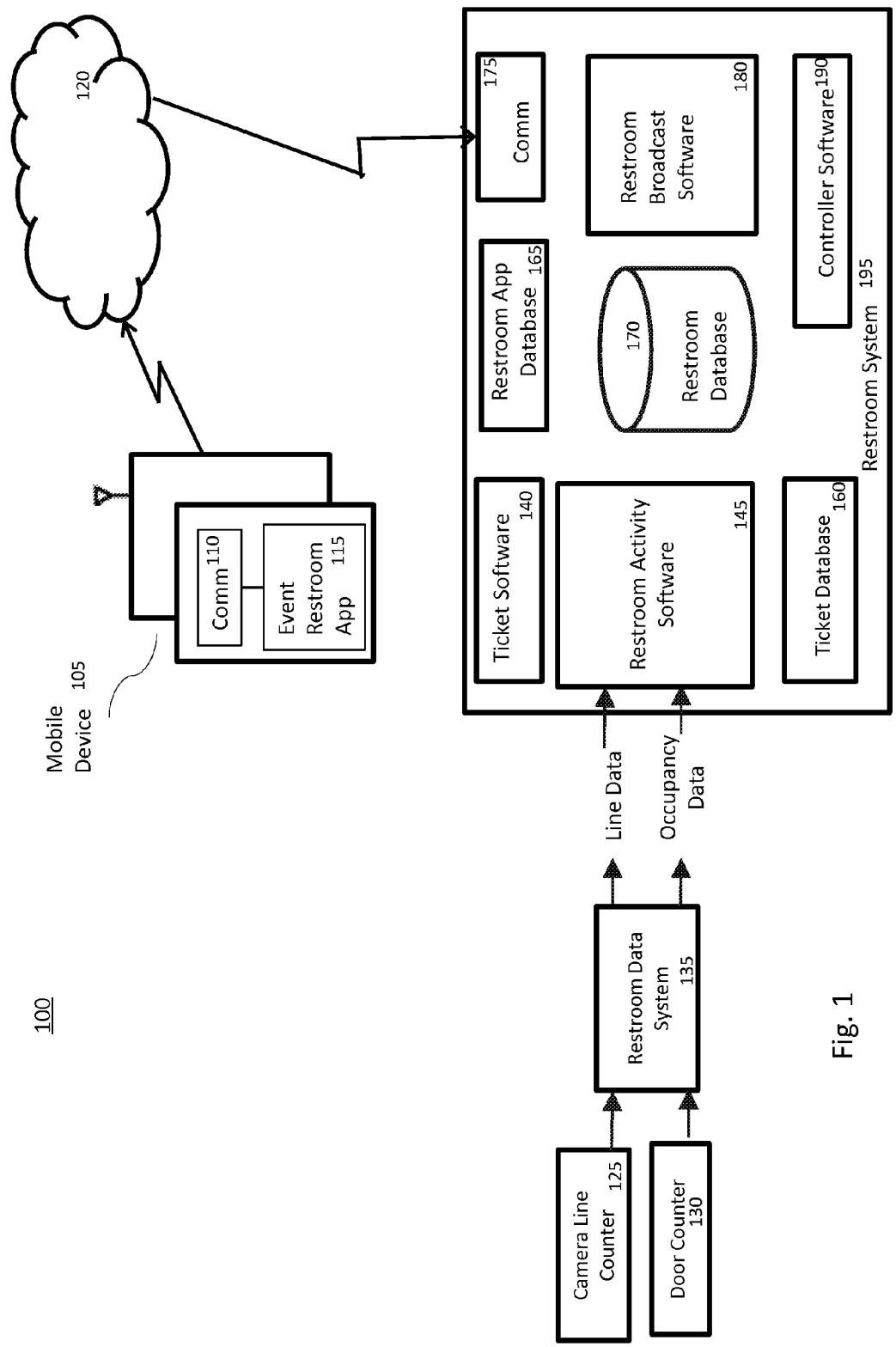
FIG. 1 illustrates a system for managing restroom traffic.

FIG. 1 illustrates a system 100 for managing restroom traffic. The system 100 of FIG. 1 includes a mobile device 105, a communication network 120 (e.g., Internet), at least one camera line counter 125, at least one door counter 130, a restroom data system 135, and a restroom system 195. The mobile device 105 includes a means of communication 110 and an event restroom application ("app") 115. The restroom system 195 includes a ticket software 140, a restroom activity software 145, a ticket database 160, a restroom app database 165, a restroom database 170, a controller software 190, a means of communication 175, and a restroom broadcast software 180. The controller software 190 controls the restroom activity software 145, the ticket software 140, and the restroom broadcast software 180. The ticket database 160 includes one or more ticket database tables. The restroom database 170 includes one or more restroom database tables.

Each camera line counter 125 collects restroom line data for a corresponding restroom. The camera line counter 125 includes a camera placed on the door jamb or inside or outside the restroom. The camera line counter 125 counts the number of people in line and sends line data to the restroom data system 135. Each door counter 130 collects restroom occupancy data for a corresponding restroom. The door counter 130 includes a counter placed on the door jamb or inside or outside the restroom. The door counter 130 counts the number of people entering and leaving the restroom and sends occupancy data to the restroom data system 135. The door counter 130 can include one or more lasers and one or more detectors. Both camera line counter data and door counter data are associated with a timestamp indicating when the data was collected and a restroom identification indicating the restroom from which the data was collected. The restroom data system 135 processes the line and occupancy data for transfer to the restroom activity software 145.

The restroom activity software 145 processes the real-time line data to provide information indicating whether there is no line or whether a restroom line is "Long," "Medium," or "Short." The restroom activity software 145 also processes the real-time occupancy data to provide occupancy information indicating whether a restroom occupancy is "Full," "75%," "50%," or "25%." The restroom activity software 145 provides occupancy information based on the number of facilities and the number of occupied facilities in a restroom. Restroom facilities can include stalls and urinals. The restroom activity software 145 also provides wait time information for a restroom using the processed line and occupancy data. The restroom activity software 145 transfers the wait time, and processed line and occupancy information along with the associated restroom identification and timestamp information to the restroom database 170.

The restroom broadcast software 180 receives wait time, line information, and occupancy information from the restroom database 170 and broadcasts the information to the event restroom app 115 each minute. The restroom broadcast software 180 also broadcasts travel time information for each restroom based on the distance between a restroom and a seat of an event ticket-holder. The restroom broadcast software 180 broadcasts information to the event restroom app 115 using the means of communication 175.

A mobile device user can purchase the event restroom app 115 when the user purchases an event ticket. The event restroom app 115 is associated with the event ticket and the corresponding seat at the event. Upon purchase of the event restroom app 115, the ticket software 140 updates the ticket database 160 to show an app associated with a particular seat was purchased. Each event restroom app 115 in the restroom app database 165 is also associated with a particular venue.

The user can then download the event restroom app 115 from the restroom app database 165. The ticket software 140 populates an event restroom app graphical user interface with a code identifying the ticket associated with the app 115. The event restroom app is only available for use for the associated event and is only enabled for the associated event.

FIG. 2 illustrates an event restroom app graphical user interface (GUI) 200. The event restroom app GUI 200 of FIG. 2 includes a map 205, a legend 210, a ticket identification code display 215, an information table 225, a table key 230, and an alarm option 235. The map 205 provides the current location of the app user and locations of restrooms. The ticket identification code display includes an enabled indicator 220. The ticket software 140 populates the ticket identification code display 215 with a code identifying the ticket associated with the event restroom app 115. The enabled indicator 220 will show whether the app is enabled.

The information table 225 includes restroom type information 240, occupancy information 250, line information 255, wait time information 260, and travel time 265 for each restroom. Restroom type information 240 can indicate whether a restroom is for men or women. Occupancy information from the restroom software 195 is used to provide occupancy information 250 in the information table 225. Occupancy information 250 indicates to what extent a restroom is occupied. Line information 255 can indicate whether there is no line or whether a line for a restroom is long, medium, or short. Wait time information 260 can indicate how much time a user needs to wait in line to use the restroom. Travel time information 265 can indicate the amount of time required for a user to walk to the restroom from the user's current location.

The information table 225 and map 205 identify each restroom with the same identification label 245 (e.g., R1, R2, R3, Rn). An event restroom app GUI user can use the table key 230 to read information such as abbreviations in the information table 225.

An event restroom app user can set a restroom alarm using the alarm option 235. A user who, for example, wants to spend less than 10 minutes walking to and waiting for the restroom can input "10 min." into the alarm option 235. The alarm option input is transferred to the restroom broadcast software 180. The broadcast software processes travel time and wait time information for each restroom at the event to identify a restroom with a combined travel time and wait time that is less than or equal to the alarm option input. The event restroom app 115 will set off an alarm to notify the user when the combined travel time and wait time is estimated to be less than ten minutes. The alarm can be in the form of a text message delivered to the mobile device 105.

FIG. 3 illustrates a ticket database table 300. The ticket database table 300 of FIG. 3 includes seat identification information 310 and event restroom app purchase information 315. App purchase information 315 indicates whether an event restroom app associated with the corresponding seat was purchased. Upon purchase of the event restroom app 115, the ticket software 140 updates the ticket database 300 to show an app associated with a particular seat was purchased. The restroom broadcast software 180 uses the ticket database table 300 to identify the seat location of an event restroom app user. The restroom broadcast software 180 uses the location information to generate travel time information to the app user. The restroom broadcast software 180 also uses location information to identify the venue and corresponding restrooms associated with the event restroom app 115. The restroom broadcast software 180 broadcasts travel time, wait time, and line and occupancy information for restrooms associated with the event restroom app 115.

FIG. 4 illustrates a restroom database table 400. The restroom database table 400 of FIG. 4 includes restroom identification information 405, timestamp information 410, line information 415, occupancy information 420, and wait time information 425. Line information 415, occupancy information 420, and wait time information 425 from the restroom activity software 145 is recorded in the restroom database table 400 for each minute for each restroom. The timestamp information 410 provides the time at which the corresponding camera line counter 125 and door counter 130 collected data used to derive the corresponding line information 415, occupancy information 420, and wait time information 425. The restroom identification information 405 identifies the restroom. The restroom identification information 405 can be customized for each event. For example, the line was long, the occupancy was full, and there was a 10 minute wait for restroom "R1" at time 1:00.

Figure 5:
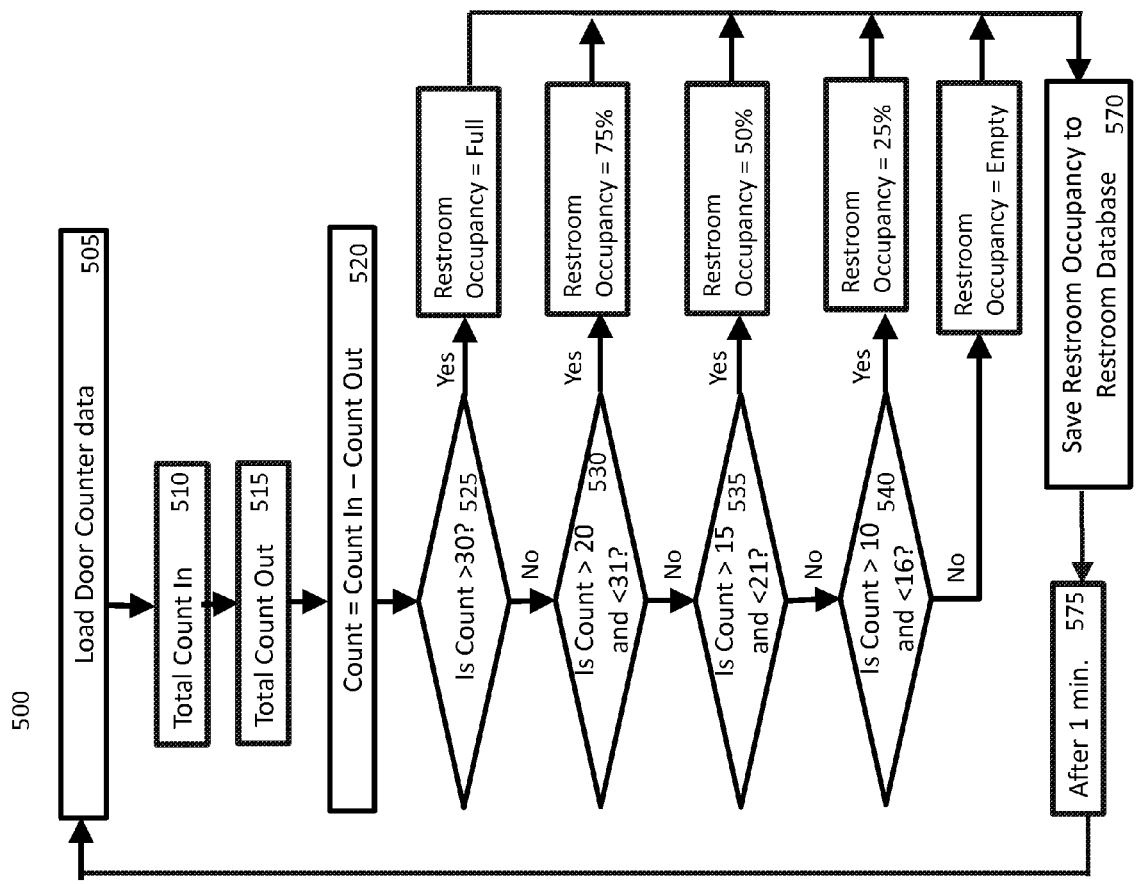
FIG. 5 illustrates a method for providing occupancy information.

FIG. 5 illustrates a method 500 for providing occupancy information. At block 505 of FIG. 5, the restroom activity software 145 loads data from the door counter 130 of a particular restroom. At block 510, the restroom activity software 145 processes the loaded door counter data to calculate the number of people who entered the restroom. At block 515, the restroom activity software 145 processes the loaded door counter data to calculate the number of people who exited the restroom. At block 520, the restroom activity software 145 calculates occupancy of the restroom by subtracting the number of people who exited the restroom from the number of people who entered the restroom. At block 525 the restroom activity software 145 outputs "Full" when there are more than 30 people occupying the restroom. At block 530, the restroom activity software 145 outputs "75%" when there are more than 20 people occupying the restroom and less than 31 people occupying the restroom. At block 535, the restroom activity software 145 outputs "50%" when there are more than 15 people occupying the restroom and less than 21 people occupying the restroom. At block 540, the restroom activity software 145 outputs "25%" when there are more than 10 people occupying the restroom and less than 16 people occupying the restroom. The restroom activity software 145 outputs "Empty" when there are not more than 10 people occupying the restroom.

At block 570 the restroom activity software saves the occupancy output to the restroom database 170. At block 575, the method 500 repeats after 1 minute. The restroom activity software provides occupancy information based on the number of occupied facilities in relation to the number of facilities provided in a restroom.

Figure 6:
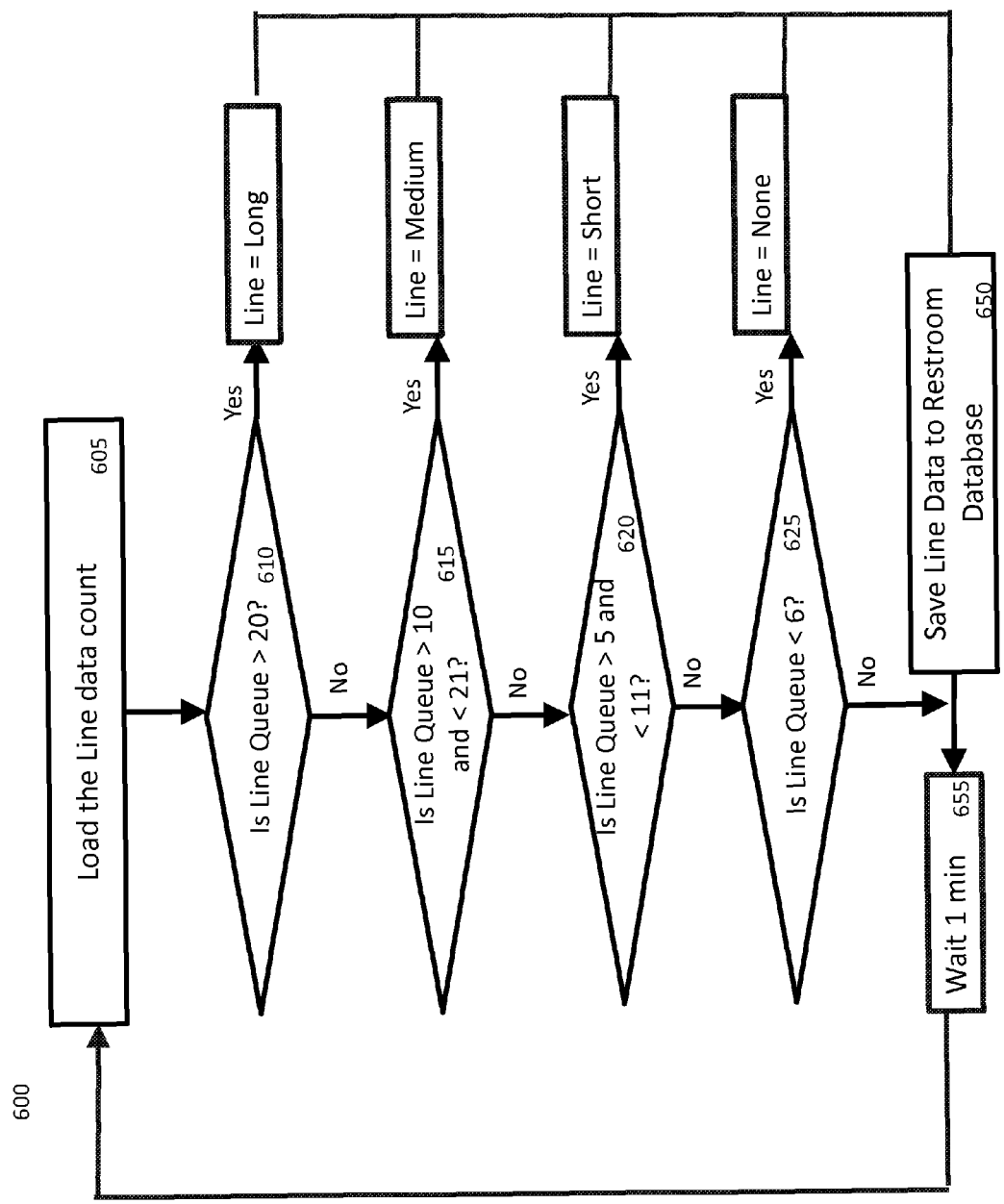
FIG. 6 illustrates a method for providing line information.

FIG. 6 illustrates a method for providing line information. At block 605 of FIG. 6, the restroom activity software 145 loads data from the camera line counter 125 of a particular restroom to determine the number of people in line for the restroom. At block 610, the restroom activity software 145 outputs "Long" when there are more than 20 people in line for the restroom. At block 615, the restroom activity software 145 outputs "Medium" when there are more than 10 people in line for the restroom and less than 21 people in line for the restroom. At block 620, the restroom activity software 145 outputs "Short" when there are more than 5 people in line for the restroom and less than 11 people in line for the restroom. At block 625, the restroom activity software 145 outputs "None" when there are less than 6 people in line for the restroom.

At block 650 the restroom activity software 145 saves the line information output to the restroom database 170. At block 655, the method 600 repeats after 1 minute. The restroom activity software provides line information based on the number of facilities provided in a restroom in relation to the number of people in line for the restroom.

Figure 7:
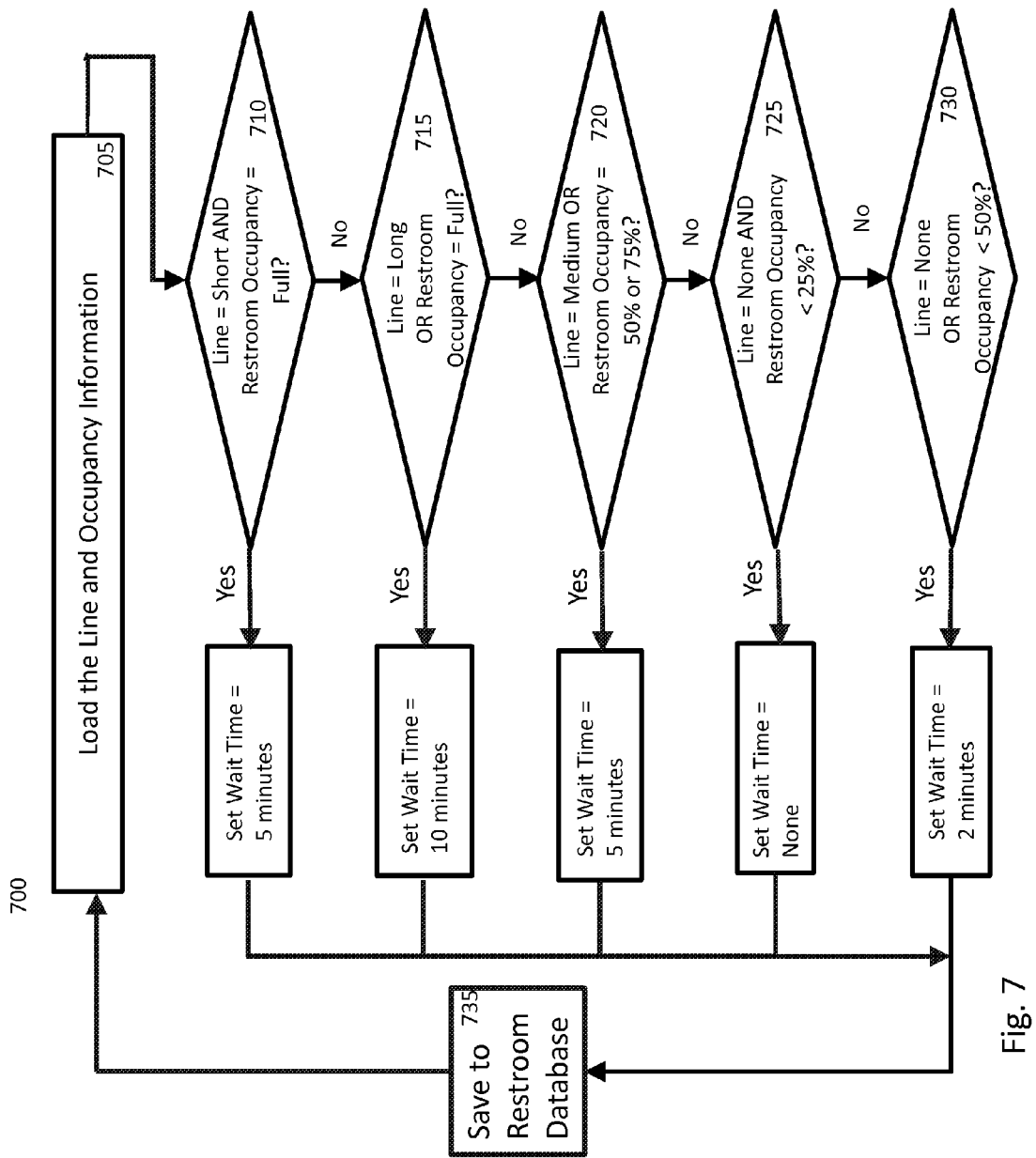
FIG. 7 illustrates a method for providing wait time information.

FIG. 7 illustrates a method 700 for providing wait time information. At block 705 of FIG. 7, the restroom activity software 145 loads line information and occupancy information generated from camera line counter data and door counter data. At block 710, the restroom activity software 145 outputs "5 minutes" when the line is "Short" and the occupancy is "Full." At block 715, the restroom activity software 145 outputs "10 minutes" when the line is "Long." The restroom activity software 145 also outputs "10 minutes" when the occupancy is "Full." At block 720, the restroom activity software 145 outputs "5 minutes" when the line is "Medium." The restroom activity software 145 also outputs "5 minutes" when the occupancy is "50%" or "75%." At block 725, the restroom activity software 145 outputs "None" when the line is "None" and the occupancy is less than 25%. At block 730, the restroom activity software 145 outputs "2 minutes" when the line is "None." The restroom activity software 145 also outputs "2 minutes" when the occupancy is less than 50%. At block 735, the restroom activity software 145 saves the wait time output to the restroom database 170.

Figure 8:
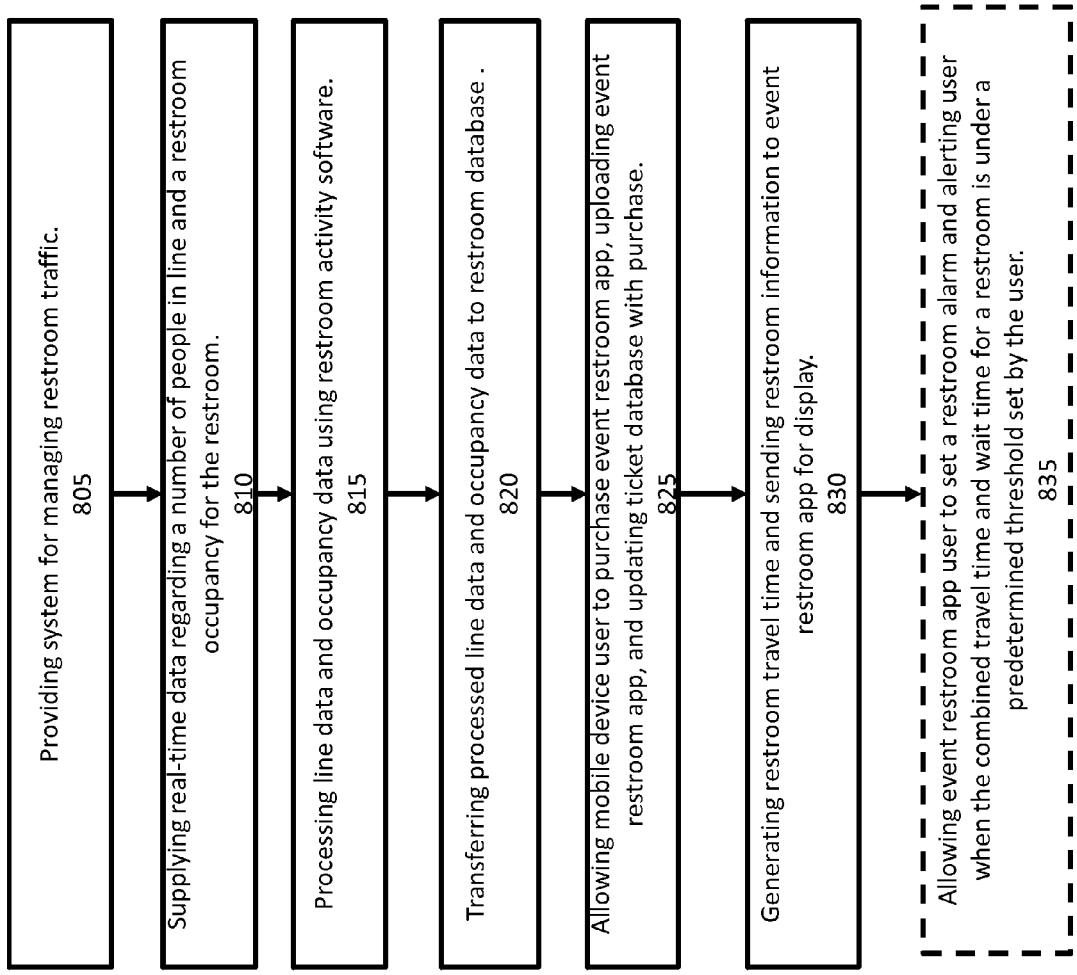
FIG. 8 illustrates a method for managing restroom traffic.

FIG. 8 illustrates a method 800 for managing restroom traffic. The method 800 includes, at block 805, providing the system 100 for managing restroom traffic. The method 800 includes, at block 810, supplying a real-time data regarding a number of people in line for a restroom and a restroom occupancy for the restroom. The method 800 includes, at block 815, processing the line data and occupancy data using the restroom activity software 145. The method 800 includes, at block 820, transferring the processed line data and occupancy data to the restroom database 170. The method 800 includes, at block 825, allowing a mobile device user to purchase the event restroom app 115, uploading the event restroom app 115, and updating the ticket database 160 with the purchase. The method 800 includes, at block 830, generating restroom travel time and sending restroom information to the event restroom app 115 for display. The method 800 can also include, at block 835, allowing an event restroom app user to set a restroom alarm and alerting the user when the combined travel time and wait time for a restroom is under a predetermined threshold set by the user.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

The invention claimed is:

1. A method for managing facility traffic, the method comprising:

capturing image data of an entrance a facility via a camera, wherein each facility is associated with a label;

analyzing the captured image data to identify a number of persons in line for the facility;

receiving occupancy data for the facility from a door counter, wherein the occupancy data is based on one or more lasers and one or more detectors indicating a number of people entering the facility and a number of people leaving the facility;

calculating a wait time for the facility based on the number of people in line for the facility as indicated by the line data and the number of people entering the facility and the number of people leaving the facility as indicated by the occupancy data;

receiving, from a user device, an alarm threshold;

identifying a location assigned to the user device using ticket data associated with the user device and stored in a ticket database;

calculating a travel time between the identified location and the facility;

causing the user device to emit an alarm signal when a sum of the wait time and the travel time is less than the alarm threshold; and providing a text notification to the user device regarding the alarm associated with the facility as identified by the label.

2. The method of claim 1, wherein the text notification further includes at least one of the occupancy data, the line data, or the wait time.

3. The method of claim 1, further comprising:

capturing second line data that includes a second number of persons in line for a second facility;

receiving second occupancy data for the second facility;

calculating a second wait time for the second facility using the second line data and the second occupancy data; and calculating a second travel time to the second facility using the location of the user device.

4. The method of claim 1, further comprising transmitting at least one of facility type information or facility identification information associated with the facility to the user device.

5. The method of claim 1, further comprising:

enabling a process for performing one or more of capturing the image data, analyzing the image data, receiving the occupancy data, determining the wait time, receiving the alarm threshold, determining the travel time, or causing the user device to emit the alarm signal for a first event associated with the facility; and disabling the process for a second event associated with the facility.

6. A system for managing facility traffic, the system comprising:

a camera that captures image data of an entrance of a facility, wherein each facility is associated with a label;

a processor that executes instructions that stored in memory, wherein execution of the instructions by the processor:

analyzes the captured image data to identify line data that includes a number of persons in line for the facility;

retrieves occupancy data for the facility from a door counter, wherein the occupancy data is based on one or more lasers and one or more detectors indicating a number of people entering the facility and a number of people leaving the facility;

receives, from a user device, an alarm threshold;

calculates a wait time for the facility based on the number of people in line for the facility as indicated by the line data and the number of people entering the facility and the number of people leaving the facility as indicated by the occupancy data;

identifies a location assigned to the user device using ticket data associated with the user device and stored in a ticket database;

calculates a travel time between the identified location and the facility;

causes the user device to emit an alarm signal when a sum of the wait time and the travel time is less than the alarm threshold; and provides a text notification to the user device regarding the alarm associated with the facility as identified by the label.

7. The system of claim 6, wherein the notification includes at least one of the occupancy data, the line data, or the wait time.

8. The system of claim 6, wherein the instructions when executed further cause the processor to:

capture second line data that includes a second number of persons in line for a second facility;

retrieve second occupancy data for the second facility;

calculate a second wait time for the second facility using the second line data and the second occupancy data; and calculate a second travel time to the second facility using the location of the user device.

9. The system of claim 6, wherein the instructions when executed further cause the processor to transmit at least one of facility type information or facility identification information associated with the facility to the user device.

10. The system of claim 6, wherein the instructions when executed further cause the processor to:

enable a process for causing one or more of the system to capture the image data, analyze the image data, receive the occupancy data, determine the wait time, receive the alarm threshold, determine the travel time, or cause the user device to emit the alarm signal for a first event associated with the facility; and disable the process for a second event associated with the facility.

11. A non-transitory computer-readable storage medium having embodied thereon a program executable by a processor to perform a method for managing facility traffic, the method comprising:

capturing image data of a facility, wherein each facility is associated with a label;

analyzing the captured image data to identify a number of persons in line for the facility;

receiving occupancy data for the facility from a door counter, wherein the occupancy data is based on one or more lasers and one or more detectors indicating a number of people entering the facility and a number of people leaving the facility;

calculating a wait time for the facility based on the number of people in line for the facility as indicated by the line data and the number of people entering the facility and the number of people leaving the facility as indicated by the occupancy data;

receiving, from a user device, an alarm threshold;

identifying a location assigned to the user device using ticket data associated with the user device and stored in a ticket database;

calculating a travel time between the identified location and the facility;

causing the user device to emit an alarm signal when a sum of the wait time and the travel time is less than the alarm threshold; and providing a text notification to the user device regarding the alarm associated with the facility as identified by the label.

12. The method of claim 1, wherein the occupancy data is associated with a timestamp.

13. The method of claim 1, further comprising identifying that the occupancy data has met a predefined benchmark regarding a level of occupancy.

14. The method of claim 13, wherein the predefined benchmark is based on a predefined maximum occupancy of the facility.

15. The method of claim 1, further comprising identifying that the line data has met a predefined benchmark regarding a line length.

16. The method of claim 1, further comprising broadcasting the wait time to one or more user devices in a venue associated with the facility.

17. The method of claim 1, further comprising storing occupancy data and line data for a plurality of different facilities within a venue.

18. The method of claim 17, further comprising updating the stored occupancy data and line at a predefined time interval.

\* \* \* \* \*